(12) United States Patent
Thuru et al.

(10) Patent No.: US 9,163,360 B2
(45) Date of Patent: Oct. 20, 2015

(54) METHOD AND DEVICE FOR THE ALUMINOTHERMIC WELDING OF RAILS

(75) Inventors: Jean-Jacques Thuru, St. Amand les Eaux (FR); Jean-Pierre Colliaut, legal representative, Raismes (FR); Lionel Winiar, Ronchin (FR)

(73) Assignee: RAILTECH INTERNATIONAL, Raismes (FR)

( * ) Notice: Subject to any disclaimer, the term of this patent is extended or adjusted under 35 U.S.C. 154(b) by 0 days.

(21) Appl. No.: 13/824,984

(22) PCT Filed: Oct. 14, 2011

(86) PCT No.: PCT/EP2011/067958
§ 371 (c)(1),
(2), (4) Date: Feb. 20, 2014

(87) PCT Pub. No.: WO2012/049282
PCT Pub. Date: Apr. 19, 2012

(65) Prior Publication Data
US 2014/0182803 A1 Jul. 3, 2014

(30) Foreign Application Priority Data

Oct. 15, 2010 (FR) .................................... 10 58413

(51) Int. Cl.
*E01B 11/52* (2006.01)
*E01B 29/44* (2006.01)
(Continued)

(52) U.S. Cl.
CPC .................. *E01B 11/52* (2013.01); *B23K 23/00* (2013.01); *E01B 29/44* (2013.01); *B22C 9/22* (2013.01); *B22D 19/04* (2013.01); *B22D 19/16* (2013.01); *B23K 2201/26* (2013.01)

(58) Field of Classification Search
CPC .......... B22C 9/22; B22D 19/00; B22D 19/02; B22D 19/04; B22D 19/16
USPC .......... 164/54, 333, 335; 228/234.3; 266/167; 249/106, 197, 86, 83, 90
See application file for complete search history.

(56) References Cited

U.S. PATENT DOCUMENTS

| 5,151,202 A | 9/1992 | Bommart |
| 6,227,282 B1 | 5/2001 | Kuster et al. |

(Continued)

FOREIGN PATENT DOCUMENTS

| DE | 729580 C | 12/1942 |
| EP | 0407240 B1 | 2/1995 |

(Continued)

OTHER PUBLICATIONS

French Preliminary Search Report for FR Application No. 1058413 dated May 27, 2011.

(Continued)

*Primary Examiner* — Kevin P Kerns
*Assistant Examiner* — Steven Ha
(74) *Attorney, Agent, or Firm* — Blakely Sokoloff Taylor & Zafman

(57) ABSTRACT

The invention concerns a method for the aluminothermic welding of rails, comprising the steps of:
  triggering an aluminothermic reaction in a crucible (2),
  casting the metal derived from said reaction into the mold (1), so as to fill the molding cavity starting from the foot of the rail,
  after filling of the molding cavity, triggering a second aluminothermic reaction above the rail head, and casting the metal derived from said reaction into said molding cavity in the region of the rail head.

The invention also concerns a mold (1) adapted to fit over the two rail ends to form a molding cavity (10), comprising a crucible (4) arranged above the region of the rail head so that it is fed with molten metal from the molding cavity (10) via a secondary channel (42).

10 Claims, 2 Drawing Sheets

(51) Int. Cl.
*B23K 23/00* (2006.01)
*B22C 9/22* (2006.01)
*B22D 19/04* (2006.01)
*B22D 19/16* (2006.01)

(56) References Cited

U.S. PATENT DOCUMENTS 7,717,286 B2 5/2010 Delcroix et al.

2010/0276109 A1 11/2010 Winiar et al.

FOREIGN PATENT DOCUMENTS

EP 1534459 B1 10/2009
WO WO 2009/065864 A1 5/2009

OTHER PUBLICATIONS

International Search Report for PCT/EP2011/067958 dated Jan. 23, 2012.

A-A

METHOD AND DEVICE FOR THE ALUMINOTHERMIC WELDING OF RAILS

FIELD OF THE INVENTION

The present invention concerns a method and device for the aluminothermic welding of rails.

BACKGROUND OF THE INVENTION

Aluminothermic welding is a process which has long been used to join together railway rails placed end to end.

For this purpose, a mould generally formed of three main parts is arranged around the ends of the rails to be welded, a crucible containing an aluminothermic charge is placed on said mould and said charge is ignited to initiate the aluminothermic reaction.

The molten metal derived from this reaction then flows into the mould and fills the moulding cavity.

After the metal has solidified and the mould has been released, the excess metal is removed and the weld region is polished to provide good continuity with the profile of the rails.

However, with this method the nature of weld metal is identical throughout the entire weld region, from the foot of the rail as far as the rail head.

Yet it is desirable, in some applications, to have a weld metal at the rail head which has different mechanical properties, and in particular which has greater hardness.

For example, for railway lines intended for transporting freight on which greater demand is placed, rails are used that are hardened at the rail head in order to extend their lifetime.

It is therefore desirable that the weld should have a hardness profile that is comparable with that of the rails i.e. greater hardness in the region of the rail head and greater ductility at the foot of the rail.

For this purpose, U.S. Pat. No. 6,227,282 has already described a method for aluminothermic welding in which an aluminothermic reaction is initiated in a crucible and the molten metal derived from this reaction is poured into the mould in which alloying additives containing a hardening agent have previously been placed via the diverting plug of the mould.

The additives may be in powder form contained in a capsule carried by the diverting plug or inserted in a cavity of the diverting plug.

The container containing the additives must be positioned in relation to the type of casting (uphill or downhill) so that only the metal intended to form the rail head region comes in contact with this head, and therefore the alloying of the aluminothermic metal with the additives containing the hardening agent only takes place in the region of the rail head.

However, while this method appears to be advantageous in theory, it does not in practice allow the expected localized hardening to be obtained.

The hardening agent is found to diffuse throughout the entire moulding cavity, which means that essentially homogeneous hardness is obtained over the full height of the rail.

It is therefore one objective of the present invention to provide an aluminothermic welding method which allows localized hardening of the weld at the rail head with good reliability and good reproducibility.

A further objective of the invention is to design a simple, robust device which can be used to implement this method.

BRIEF DESCRIPTION OF THE INVENTION

According to the invention, a method is proposed for the aluminothermic welding of rails, in which two rail ends to be welded are surrounded by a weld mould defining a moulding cavity, comprising the steps of:

triggering an aluminothermic reaction in a crucible, casting the metal derived from said reaction into the mould so as to fill the moulding cavity starting from the foot of the rail, said method, after the moulding cavity has been filled, comprising a step to trigger a second aluminothermic reaction above the rail head and to cast the metal derived from said reaction into the moulding cavity in the region of the rail head.

In particularly advantageous manner, the second aluminothermic reaction is triggered from a second aluminothermic charge contained in a so-called secondary crucible positioned in the mould above the rail head.

Preferably, the aluminothermic charge used in the second reaction is different from the aluminothermic charge used in the first reaction.

In particular the aluminothermic charge used in the second reaction advantageously comprises at least one hardening agent such as vanadium.

The triggering of the second aluminothermic reaction is caused by mere contacting of the aluminothermic charge with the molten metal derived from the first aluminothermic reaction.

A further subject of the invention is a mould for the aluminothermic welding of rails, adapted to fit over the two rail ends so as to form a moulding cavity, comprising a so-called secondary crucible arranged above the region of the rail head so that it is fed with molten metal from the moulding cavity via a secondary channel.

Said secondary crucible advantageously rests on rims arranged in the mould.

Also, the secondary crucible has a casting orifice which can be plugged by a hot-melt plug.

The mould is typically in material having one-off use.

It further comprises at least one filling pipe extending between the upper part of the mould and a lower region of the moulding cavity so that it is possible to perform uphill casting.

Finally, the invention concerns a device for the aluminothermic welding of rails, comprising a mould such as previously described and a crucible for aluminothermic reaction suited to be positioned on the mould.

Said device is adapted for implementing the above-described method.

BRIEF DESCRIPTION OF THE DRAWINGS

Other characteristics and advantages of the invention will become apparent from the following detailed description with reference to the appended drawings in which.

DETAILED DESCRIPTION OF THE INVENTION

Figure 1:
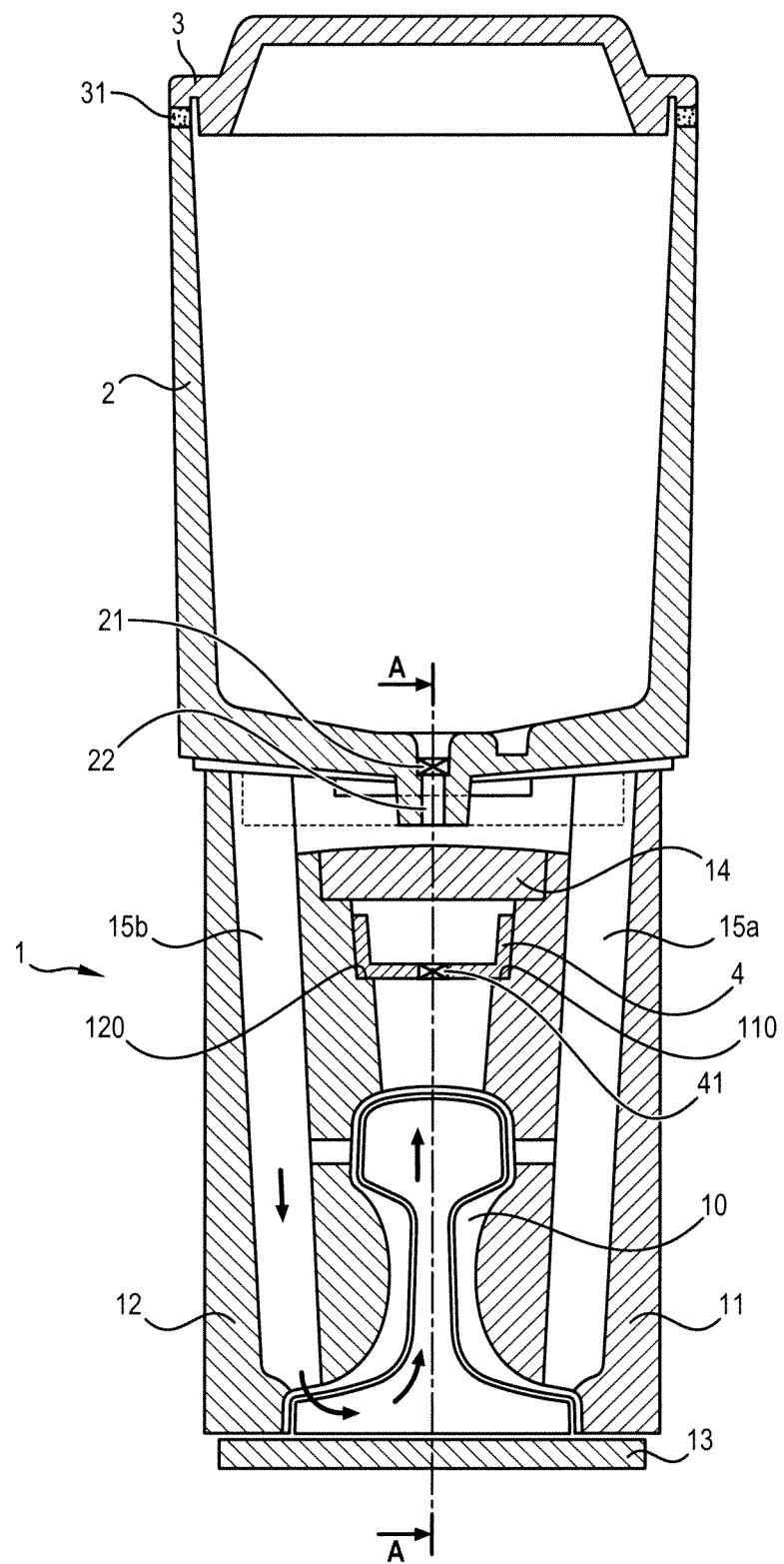
FIG. 1 is a cross-sectional view of an aluminothermic welding device conforming to the invention.

With reference to FIG. 1, the aluminothermic welding device comprises a mould 1 defining the moulding cavity, a crucible 2 for the aluminothermic reaction and a crucible lid 3.

In the illustrated device, the mould 1 chiefly comprises three parts which define the moulding cavity 10, namely two substantially symmetrical semi-shells 11, 12 intended to be positioned either side of the rails, and a bottom plate 13 intended to be positioned underneath the foot of the rail.

Advantageously, these different parts 11, 12, 13 are in single-use material, e.g. sand aggregate.

In manner also known per se, metal parts (not illustrated) are used to hold the different parts in place during welding.

It is to be noted that the mould may be formed of a different number of parts (typically from two to five) depending on the design adopted by the person skilled in the art in relation to the type of method and the shape of the rails, without however departing from the scope of the present invention.

The mould 1, underneath the filling orifice, also comprises a cross-piece 14 which is typically in the general form of a plate whose function is to deflect the molten metal towards the mould-filling pipes 15a, 15b which are offset from the filling orifice.

The deflecting plate 14 rests on rims provided for this purpose in the semi-shells 11, 12.

The mould further comprises a secondary crucible 4 intended to receive a secondary aluminothermic charge containing at least one hardening agent in addition to the conventional composition of the charge.

The secondary crucible 4 is advantageously in the general form of a container open in its upper part and having a bottom provided with a casting orifice 40 which is plugged by a plug 41 e.g. a hot-melt plug.

In the illustrated configuration, the secondary crucible 4 is of parallelepiped shape but evidently any other suitable shape e.g. ovoid is possible without departing from the scope of the invention.

Preferably, the secondary crucible 4, like the other parts of the mould 1, is in single-use material such as sand aggregate.

The secondary crucible 4 rests on rims 110, 120 provided for this purpose in the semi-shells 11, 12.

It is therefore located underneath the deflecting plate 14 but is independent thereof.

Figure 2:
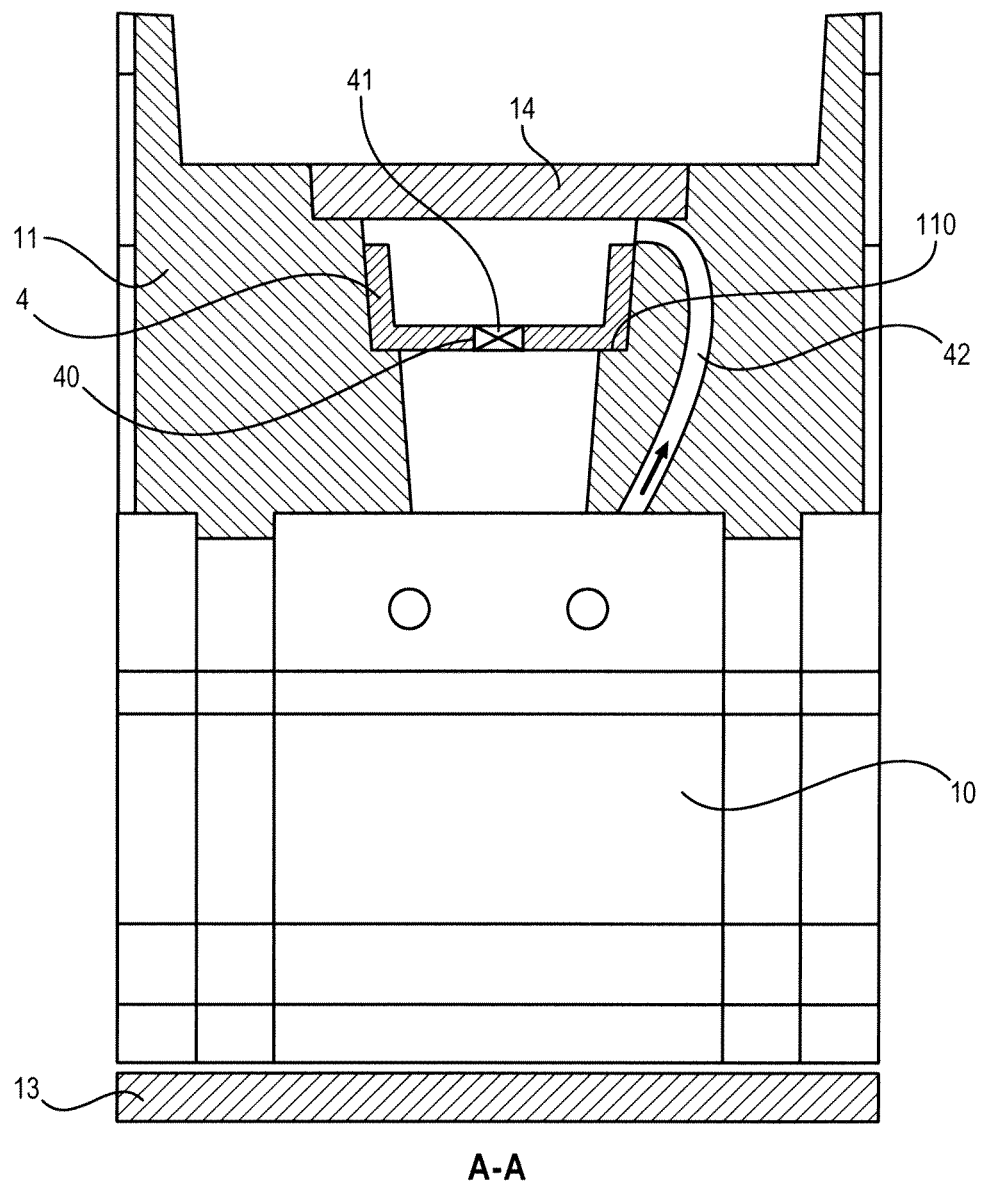
FIG. 2 is a cross-sectional view of an aluminothermic welding mould conforming to the invention.

In addition, a secondary channel 42 which can be seen in FIG. 2 is arranged in the semi-shells 11, 12 to cause the upper part of the moulding cavity 10 (above the rail head) to communicate with the upper part of the secondary crucible 4.

The crucible 2 is a container in the general shape of a pot intended to receive an aluminothermic charge to form the weld metal.

The crucible is preferably in a single-use material such as sand aggregate.

The bottom of the crucible 2 is provided with a casting orifice 22 which is preferably plugged by a hot-melt plug 21.

In particularly advantageous manner, the shapes of the mould 1 and of the crucible 2 cooperate together to allow the crucible to be positioned directly on the mould. In this respect, reference can be made to patent EP 0 407 240 to the Applicant, which provides the person skilled in the art with numerous other details on the manner in which to obtain and use a crucible and mould for aluminothermic reaction according to the invention.

Preferably, the crucible 2 is closed by a lid 3 which allows the spraying of particles to be avoided during the aluminothermic reaction.

As disclosed in patent EP 1 534 459 to the Applicant, the lower edge of the lid 3 is advantageously provided with a filtering liner 31 via which it rests on the upper edge of the crucible.

This filtering liner 31 allows evacuation of the gases derived from the aluminothermic reaction whilst filtering these gases.

According to one variant of embodiment (not illustrated) the lid may have an orifice to insert an igniting device for the aluminothermic charge.

The lid 3 of the crucible 2 is preferably in single-use material such as sand aggregate.

The welding method implemented by means of the device just described comprises the following steps.

Initially, the parts 11, 12, 13 of the mould are placed around the ends of the rails to be welded, and the aluminothermic charge containing the hardening agent is placed in the secondary crucible 4.

The crucible 2 containing the main aluminothermic charge is placed above the mould 1 so that the casting orifice 22 of the crucible lies opposite the filling orifice of the mould.

The main aluminothermic charge (not illustrated here) contained in the crucible 2 is then ignited.

Depending on cases, an igniter can be placed inside the crucible and the crucible lid is then closed, or the igniter can be inserted through an orifice arranged for this purpose in the lid.

When the aluminothermic reaction is triggered, it produces a molten metal and slag which, on account of its low density, floats above the metal.

The hot-melt plug 21 closing the casting orifice 22 of the crucible then melts and allows the metal to be poured into the mould.

The metal enters the mould via the filling orifice and encounters the deflecting plate 14, which deflects the flow of metal towards the filling pipes 15a, 15b.

It is therefore an uphill casting method i.e. the metal flows down the pipes 15a, 15b and enters the moulding cavity 10 via the region of the foot of the rail, then moves up the moulding cavity in the direction of the rail head. This pathway is illustrated by the arrows in FIG. 1.

As can be seen in FIG. 2, which is a cross-sectional view along A-A of the mould in FIG. 1, once the metal has reached the rail head, it encounters the secondary channel 42 through which it is conveyed into the secondary crucible 4 (pathway illustrated by the arrows).

The contacting of the molten metal with the secondary aluminothermic charge (not illustrated here) triggers the secondary aluminothermic reaction without any specific igniting being necessary.

The metal formed by this second reaction, which contains the hardening agent, causes the hot-melt plug 41 to melt and flows into the moulding cavity.

Insofar as this cavity is already filled with metal derived from the main aluminothermic reaction, the additional metal diffuses in controlled manner and remains localized in the region of the rail head.

As a result, a hardened weld is obtained at the rail head but it is more ductile at the foot of the rail.

The secondary aluminothermic charge is sized, in terms of volume and content of hardening agent, to provide a limited quantity of additional metal and to impart the desired hardness to the rail head.

As is conventional, once the metal has sufficiently hardened, the parts 11, 12, 13 of the mould are released and can be destroyed, and the welded portion is finished to ensure good continuity with the rails.

It is specified that, contrary to what may be feared by those skilled in the art, the generating of a secondary aluminothermic reaction inside the mould does not give rise to polluting of the weld metal by the slag derived from this reaction.

The corundum produced by the aluminothermic reaction occurring in the secondary crucible, which is positioned above the hot top, has a tendency to decant upwardly but it is at least partly retained by the deflecting plate 14.

On the other hand, it does not move down into the moulding cavity on account of its density that is much lower than that of the steel.

It is not necessary to make provision for extraction of the corundum derived from the secondary aluminothermic reaction since, even if it remains in the secondary crucible, the corundum remains confined about six centimeters above the top of the rail head and therefore does not have any harmful influence on the weld.

Finally, the example just given is evidently only a particular illustration and is in no way limiting with regard to the manner in which the invention can be implemented.

The invention claimed is:

1. A method for the aluminothermic welding of rails, wherein two rail ends to be welded are surrounded by a welding mould defining a moulding cavity, comprising the steps of:
   triggering a first aluminothermic reaction from a first aluminothermic charge in a crucible,
   casting a metal derived from said first aluminothermic reaction into the mould, so as to fill the moulding cavity starting from a foot of the rail,
   said method comprising, after filling of the mould cavity, a step to trigger a second aluminothermic reaction from a second aluminothermic charge above a rail head, and to cast a metal derived from said second aluminothermic reaction into the moulding cavity in the region of the rail head.

2. The method of claim 1, wherein the second aluminothermic charge has a different composition from the first aluminothermic charge.

3. The method of claim 2, wherein the second aluminothermic charge comprises at least one hardening agent.

4. The method of claim 1, wherein the triggering of the second aluminothermic reaction is performed by mere contacting of the second aluminothermic charge with the molten metal derived from the first aluminothermic reaction.

5. A mould for the aluminothermic welding of rails, configured to fit over two rail ends so as to form a moulding cavity, the mould comprising;
   a filling orifice for receiving a molten metal from a crucible,
   at least one mould-filling pipe offset from the filling orifice and configured to receive said molten metal from said filling orifice, said at least one pipe extending into the moulding cavity in a region of a foot of the rail,
   a secondary crucible arranged above the region of a rail head and below the filling orifice configured to be fed with molten metal from the moulding cavity via a secondary channel coupled to the moulding cavity and the secondary crucible.

6. The mould of claim 5, wherein the secondary crucible rests on rims arranged in the mould.

7. The mould of claim 5, wherein the secondary crucible has a casting orifice closed by a hot-melt plug.

8. The mould of claim 5, made of single-use material.

9. The mould of claim 5, further comprising at least one filling pipe extending between an upper part of the mould and a lower region of the moulding cavity so as to perform uphill casting.

10. A device for the aluminothermic welding of rails, comprising
   a first crucible configured to contain a first aluminothermic charge,
   a mould configured to fit over rail ends so as to form a moulding cavity, comprising a filling orifice for receiving molten metal from the first crucible, the mould comprising a secondary crucible arranged above a region of a rail head and below the filling orifice so as to be fed with molten metal from the moulding cavity via a secondary channel coupled to the moulding cavity and the secondary crucible, and
   wherein the first crucible is configured to be placed on said mould.

* * * * *